June 22, 1926.
A. E. COOK ET AL
1,589,943
EXTENSIBLE MOTOR TRUCK
Filed Nov. 15, 1922 5 Sheets-Sheet 2
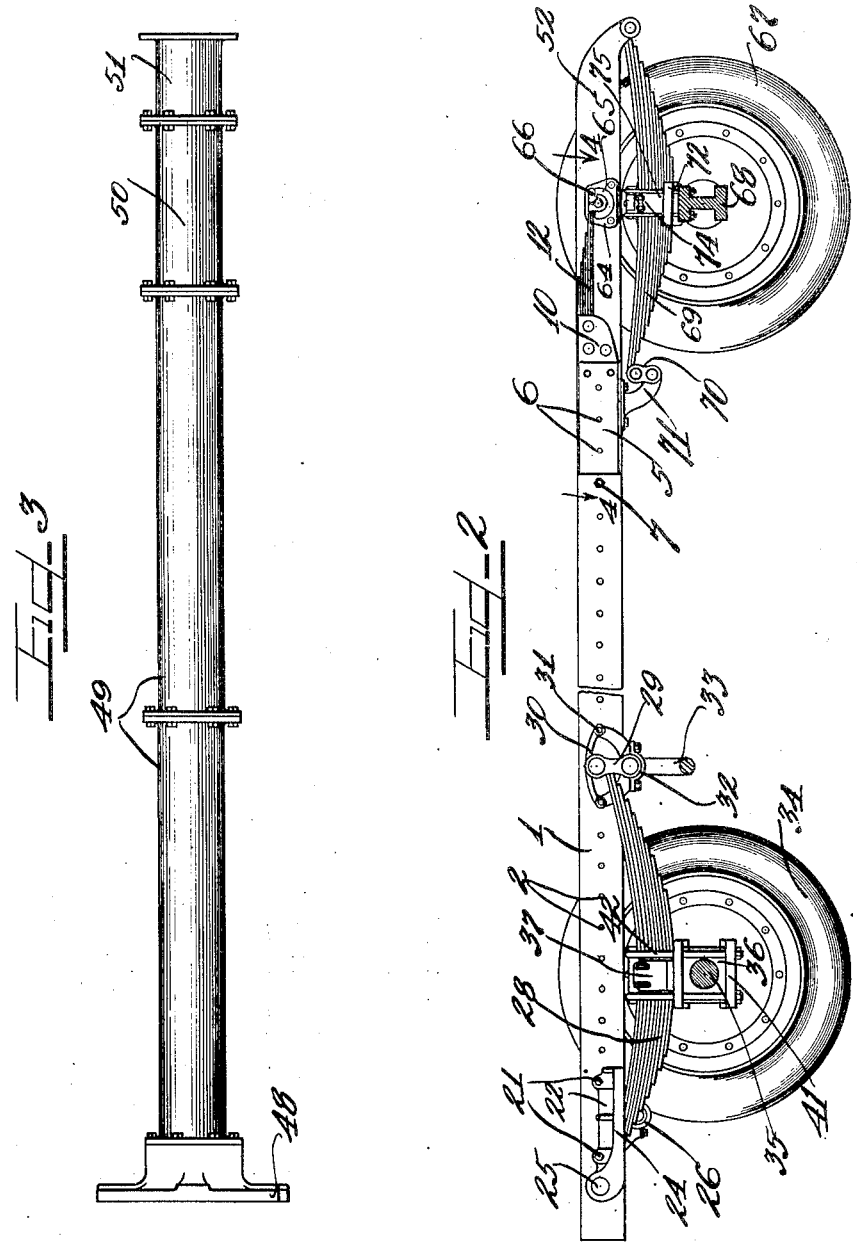

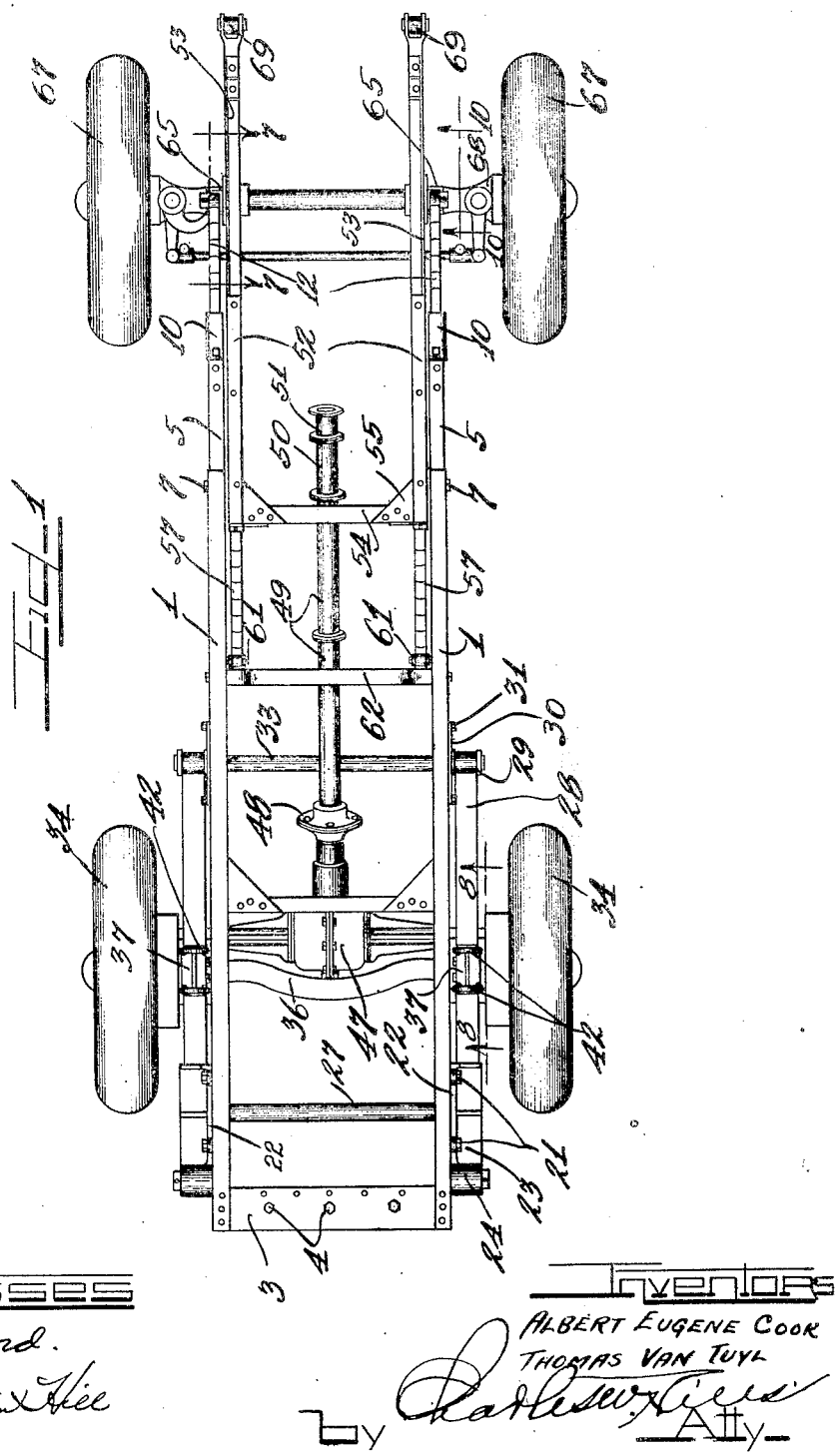

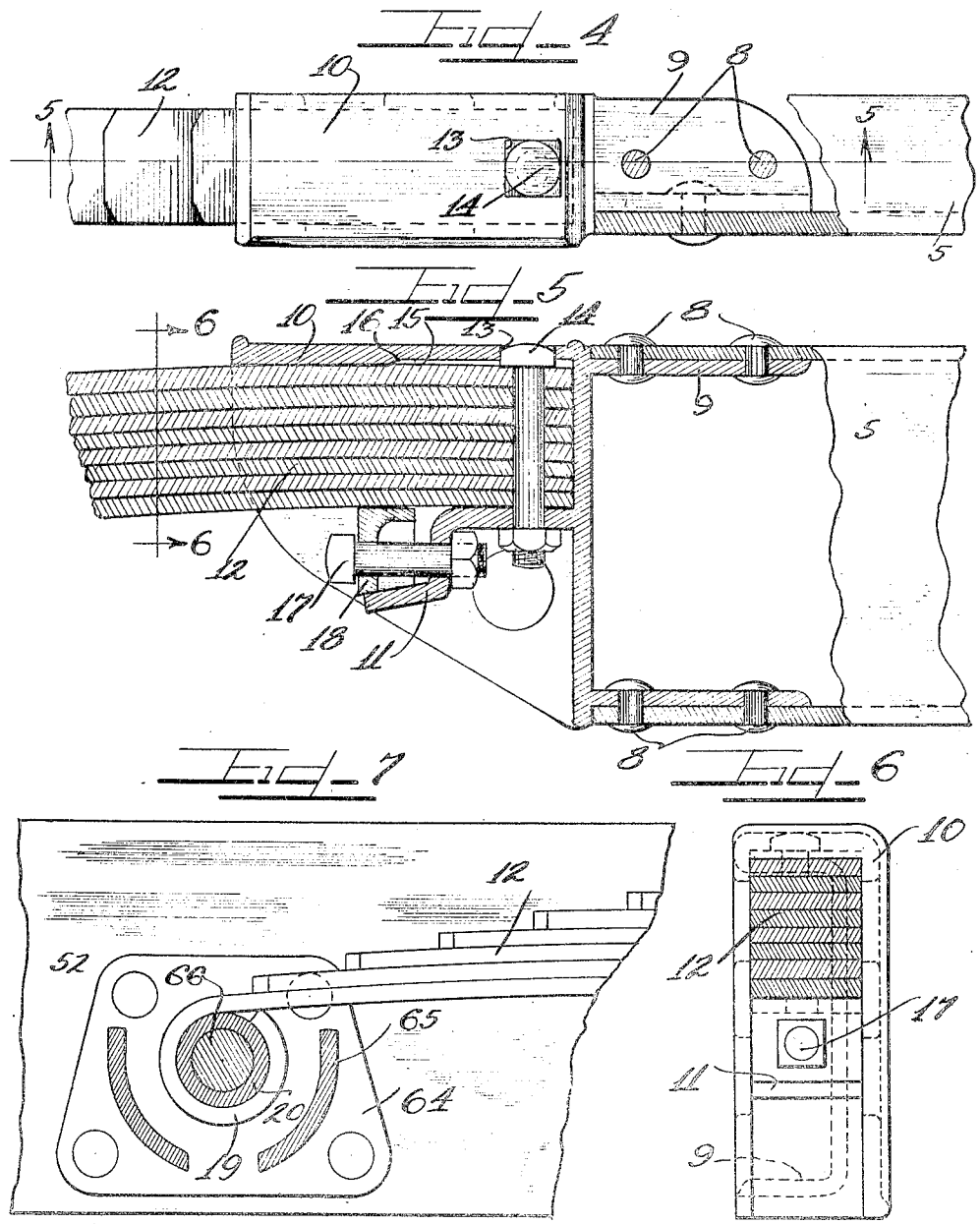

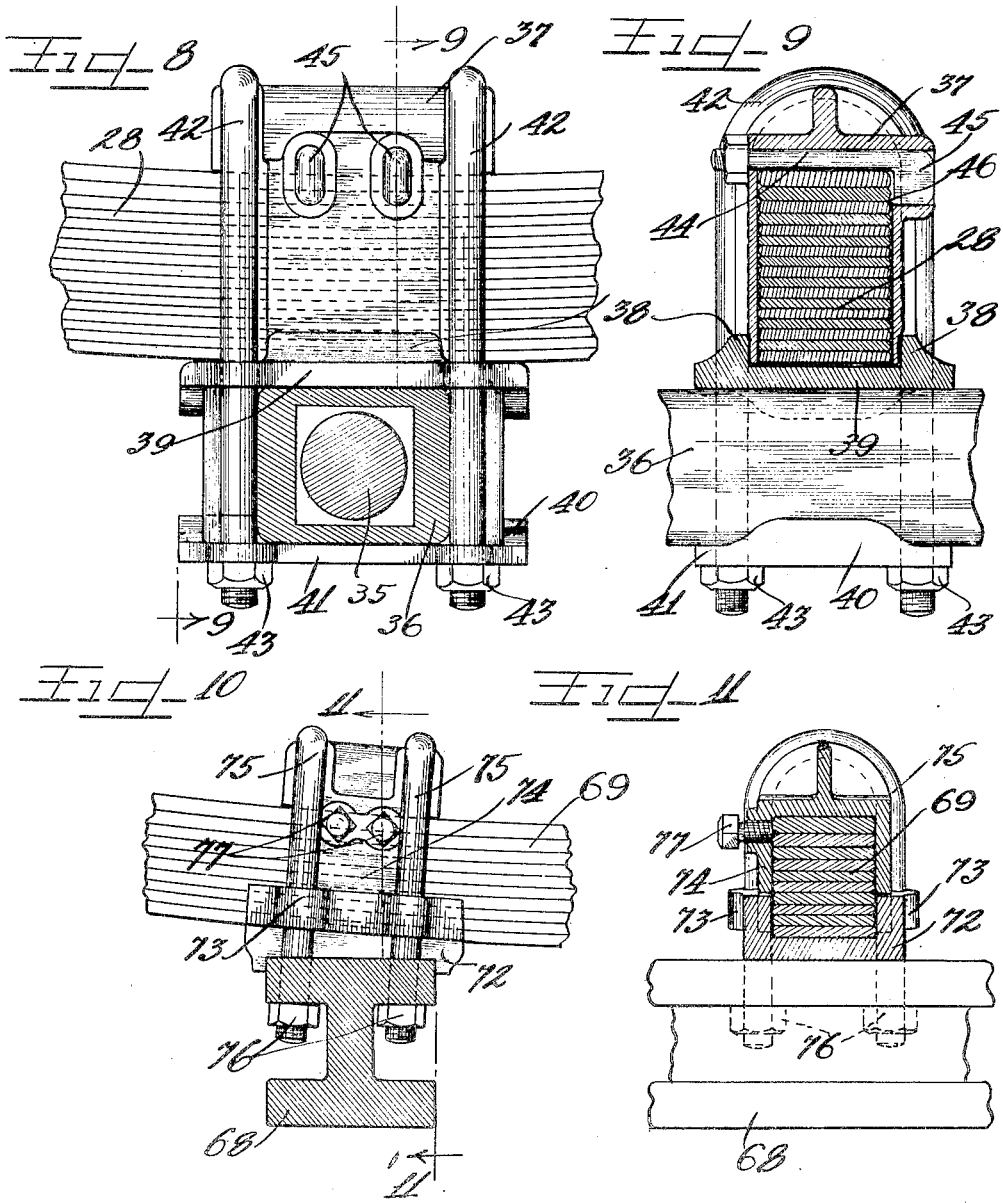

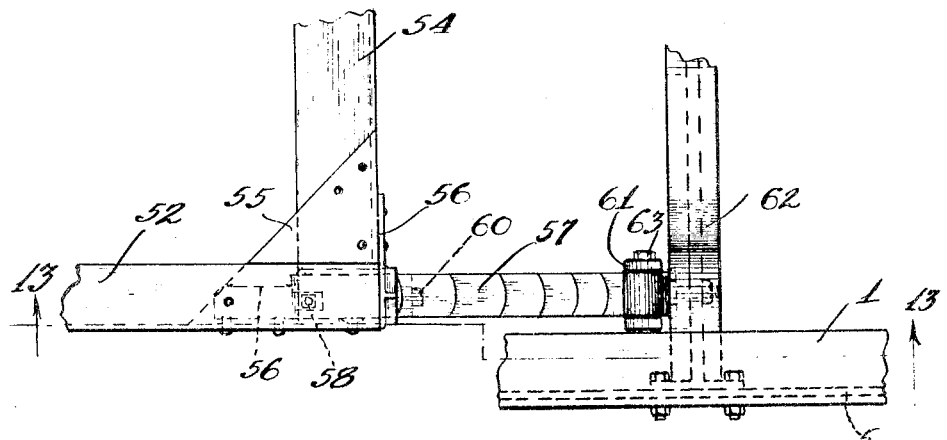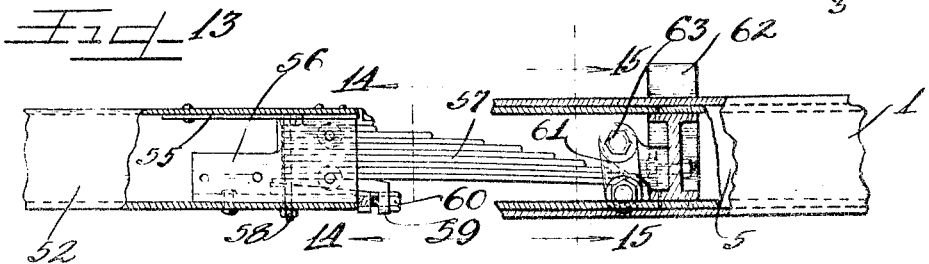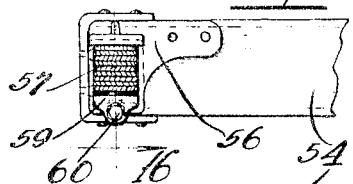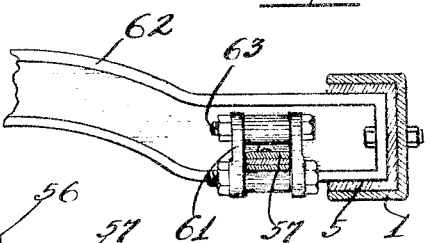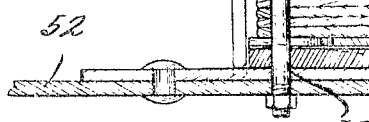

Patented June 22, 1926.

1,589,943

UNITED STATES PATENT OFFICE.

ALBERT EUGENE COOK, OF EVANSTON, AND THOMAS VAN TUYL, OF KANKAKEE, ILLINOIS; SAID VAN TUYL ASSIGNOR TO SAID COOK.

EXTENSIBLE MOTOR TRUCK.

Application filed November 15, 1922. Serial No. 601,049.

This invention relates to an improved type of motor truck wherein the length of the frame as well as the length of the wheel base may be readily varied to carry bodies of different length, said truck embracing two independent units adapted to telescope and be flexibly connected one to the other with the load carrying or rear unit constructed with an extendible frame, brake rods and propelling shaft and with the rear springs and wheels adapted to be mounted in different positions along the length of the rear unit frame.

It is an object of this invention to provide a truck constructed to allow for varying the length of the frame and the wheel base, by changing the points of attachment of the rear springs on the load carrying frame as well as by telescoping the sill members comprising the load carrying frame.

It is also an object of the invention to provide a truck having a complete load-carrying rear unit having an extensible frame constructed to permit the supports for the rear springs to be removably secured thereto in various positions to advance or retract the position of the rear axle and wheels.

Another object of the invention is the construction of a truck having an extensible load-carrying rear unit provided with a light weight propeller shaft constructed of sections of various lengths to permit a propeller shaft to be arranged of any desired length to correspond to an adjustment of the extensible rear unit.

It is a further object of the invention to provide a truck wherein the power plant and cab are adapted to be mounted on a front spring connected frame independently of a load carrying frame thereby reducing shock and vibrations on the working parts and insuring comfort to the driver of the truck.

It is furthermore an object of the invention to provide a motor truck wherein a rear load-carrying unit is supported on automatic load-carrying springs the rear ends of which are more flexible than the front ends and are adapted to coact with frame plates to automatically adjust themselves to varying loads.

Still another object of the invention is to provide a truck wherein the propelling of the load is accomplished through springs without the use of radius rods, by supporting the front ends of the springs on shackles while the rear and more resilient ends of the springs are anchored to supports on the rear end of the truck thereby causing the load to be pulled instead of being pushed.

It is also an object of the invention to provide an extensible motor truck consisting of spring connected front and rear units, and in which the whole power plant may be completely removed from the front unit to permit of extensive repairs and complete quick replacement when necessary.

It is an important object of this invention to provide an improved motor truck of simple construction having shock and torque absorbing spring connected frame units, one of which is extensible and is adapted to have the rear wheel supporting springs removably mounted thereon to permit changes in the length of the truck wheel base to be readily made.

Other and further important objects of this invention will be apparent from the disclosures in the specification and the accompanying drawings.

The invention (in a preferred form) is illustrated in the drawings and hereinafter more fully described.

On the drawings:

Figure 1 is a top plan view of a truck chassis embodying the principles of this invention and with the power plant removed.

Figure 2 is a side elevation thereof with parts omitted.

Figure 3 is a plan view of the tubular sectional propeller shaft removed from the truck.

Figure 4 is an enlarged fragmentary detail view taken on line 4—4 of Figure 2 with parts shown in section.

Figure 5 is a detail section taken on line 5—5 of Figure 4 with parts shown in elevation.

Figure 6 is a sectional view taken on line 6—6 of Figure 5.

Figure 7 is an enlarged fragmentary detail sectional view taken on line 7—7 of Figure 1.

Figure 8 is an enlarged sectional detail view of the rear spring and axle housing coupler taken on line 8—8 of Figure 1.

Figure 9 is a detail sectional view taken on line 9—9 of Figure 8.

Figure 10 is an enlarged side elevation of the front spring and axle coupler taken on line 10—10 of Figure 1.

Figure 11 is a section taken on line 11—11 of Figure 10.

Figure 12 is a fragmentary top plan view of spring connection between the truck frame units.

Figure 13 is a fragmentary sectional view taken on line 13—13 of Figure 12.

Figure 14 is a detail sectional view taken on line 14—14 of Figure 13.

Figure 15 is a sectional view taken on line 15—15 of Figure 13.

Figure 16 is an enlarged fragmentary detail section taken on line 16—16 of Figure 14.

As shown on the drawings:

The improved truck comprises a front power plant carrying unit and a rear load-carrying unit, said units adapted to be completely constructed and assembled independently of one another. To form a truck the two units are flexibly connected one to the other with the frames thereof telescoping.

The rear or load-carrying truck unit comprises a pair of main sills 1 each provided with a longitudinal row of spaced openings or apertures 2. The main sills 1 are rigidly connected at the rear ends by a transverse end box channel 3 having a plurality of heavy hitch bolts 4 to permit attachment of trailers or other hitches. Telescoped into the front ends of the main sills 1 are auxiliary or front section sills 5 each of which is also provided with a longitudinal row of spaced openings or apertures 6. The auxiliary sills 5 are slidable in the main sills 1 and are adapted to be secured in an adjusted position by bolts 7.

Rigidly secured in the front end of each auxiliary sill 5 by rivets 8 or other suitable means is the channel portion 9 of a spring holding socket 10 having an offset plate or partition 11 integrally formed therein upon which the inner end of a quarter-elliptic plate spring 12 is seated (Fig. 5). The top plate of the socket 10 is provided with an opening 13 to permit a retaining bolt 14 to project therethrough and through openings in the spring 12 and the partition plate 11. The inner surface of the top plate of the socket 10 is recessed at 15 affording an offset edge 16, as shown in Figure 5. The offset portion of the partition plate 11 is provided with an opening for receiving a bolt 17 for drawing a wedge block 18 inwardly between an inclined portion of the partition plate 11 and the bottom of the spring 12 thereby tending to force the inner end of said spring upwardly into the socket recess 15 and against the offset edge 16 to hold the spring locked in position. The outer end of each spring 12 has the end of the longest spring plate curled to form a loop 19 holding a sleeve 20 (Figure 7).

Rigidly secured by bolts 21 to the outer side near the rear end of each main sill 1 is a casting 22 having an outwardly projecting flange or plate forming the curved top plate 23 of a housing 24 having an upwardly projecting portion for supporting a stud 25. Formed on the bottom of the casting 22 is a bearing 26. The two bearings 26 on the castings 22 afford a support for a transverse shaft or spring connecting cross bar 27.

Engaged on the stud 25 within the upwardly projecting portion of the housing 24 is the rear end of a half-elliptic compensating load-carrying spring 28, the forward end of which is connected to a shackle 29. The shackle 29 has the lower end pivotally supported on a casting or bracket plate 30 having spaced openings therein to permit the same to be removably bolted to the main sill 1 by bolts 31. Supported in bearings 32 formed on the bottoms of the bracket plates 30 are the ends of a deflected transverse shaft or spring connecting cross bar 33.

The rear end of the rear load-carrying truck unit is supported by rear truck wheels 34 engaged on the ends of a rear axle 35 (Figure 8) disposed within a rectangular axle housing 36. The rear truck springs 28 are connected to the rear axle housing 36 by spring clips or clamps each comprising a U-shaped housing 37 adapted to be engaged over the middle portion of the spring 28 and seat between flanges 38 of a box 39 which box is engaged over the axle housing 36 and seats between flanges 40 of a bottom plate 41. The box 39 and the bottom plate 41 are provided with apertured lugs through which U-shaped straps or staple bolts 42 project. The staple bolts have the bights thereof seated over grooved portions of the housing 37 to permit the spring 28 to be rigidly clamped to the axle housing 36 by screwing nuts 43 onto the threaded ends of the staple bolts 42, as shown in Figures 8 and 9. The housing 37 is apertured to receive bolts 44 projecting therethrough transversely of the spring 28. The bolts 44 are provided with offset heads 45 having wedge beads 46 inte grally formed thereon adapted to be wedged between two leaves of the spring 28 (Figure 9).

The rear truck wheels 34 are adapted to receive a drive from a differential 47 to which a propeller shaft is connected by means of a flexible fibre universal joint 48. The propeller shaft is of tubular construction and comprises a plurality of flanged sections 49, 50 and 51 of different lengths which are removably bolted one to the other so that any desired length of propeller shaft may be obtained by suitably arranging a plurality of the propeller shaft sections to give the required length.

The front or power plant carrying unit of the truck comprises a front frame embracing front sills 52 having portions of the upper flanges thereof cut away as at 53 to receive the power plant for the truck. The inner ends of the front sills 52 are rigidly connected to a transverse cross brace 54 by plates 55. Rigidly secured to each end of the cross brace 54 and projecting into the end of the respective front sill 52 is a spring socket 56 for receiving the thick end of a quarter-elliptic plate spring 57. A retaining bolt 58 is engaged through the socket 56, the spring 57 and the bottom flange of the sill 52 to hold the spring secured in the socket. A slotted wedge 59 projects into the socket 56 below the spring 57 and is adjustable by means of a screw 60.

The ends of the front frame springs 57 are connected to shackles 61 which are bolted to an I-beam spring connecting cross bar 62 the ends of which are engaged in and bolted to the rear frame sills 1 and 5. By loosening the bolts of the shackles 61, the shackles may be reversed to position the spring supporting pin thereof above the bolt 63 instead of in the position illustrated in Figures 13 and 15. When the sills 5 are adjusted in the sills 1 it is necessary to also move the cross bar 62 a corresponding distance. This may be done by removing the retaining bolts which hold the cross bar 62 in place.

Rigidly secured to the outer side of each of the front frame sills 52 is a plate 64 having a spring socket 65 integrally formed thereon adapted to receive the end of one of the rear unit springs 12 and its sleeve 20. After the end of a spring 12 has been engaged in the spring socket 65 a pin or stud 66 is inserted into the spring socket through the sleeve 20, as illustrated in Figure 7. The inner or front ends of the rear load-carrying unit of the truck is thus resiliently connected to the front power plant carrying unit.

The front power plant carrying unit of the truck is supported by front wheels 67 mounted on the ends of a front I-beam axle 68. Rigidly secured upon the top of each end of the front axle 68 is a half-elliptic spring 69 the front end of which is anchored to the front end of a front frame sill 52, while the rear end of said spring 69 is connected to a shackle 70 pivoted to an arm or bracket 71 fastened underneath the sill 52 (Figure 2).

Each front spring 69 is secured to the front axle 68 by means of a spring clip or clamp comprising a lower box section or clamp 72 having apertured lugs 73. An upper clamp or U-shaped housing 74 is engaged over the spring above the clamp 72 and is provided with grooves for receiving the bights of a pair of U-shaped straps or staple bolts 75 the ends of which project through the apertured lugs 73 and through openings provided in the top flange of the axle 68 (Figure 10). Nuts 76 are engaged on the staple bolts 75 to cause the clamp sections 72 and 74 to be drawn toward one another to clamp the spring therebetween. Set screws 77 are provided on the top clamp section 74 and engage the spring 69 (Figure 11) to hold the spring against longitudinal movement through the spring clip.

The front axle, the front wheels, steering gear, cab and engine, together with the front frame section, make up the front or power carrying independent truck unit. The rear or load-carrying truck unit is independent of the front unit and includes the rear extensible frame section, the sectional propeller shaft, rear axle and wheels. The rear frame may be adjusted and set at different intervals to provide a length of frame to suit any load as to bulk and weight thereby making it possible to perfectly balance the load to be carried over the rear wheels.

The two frame sections are resiliently connected one to the other by the quarter-elliptic springs 12 and 57, the rear frame permitting the length of the truck frame and the wheel base to be varied, while the telescoping of the front and rear frame sections greatly increases the strength of the center portion of the truck frame.

If desired the extensible load-carrying rear truck unit may be attached to other motor driven vehicles in a manner similar to that in which it is connected to the front power carrying truck unit of this invention.

It will be noted that the driving of the load is accomplished through the rear springs without the use of radius rods. The shackles 29 being connected at the forward ends of the rear springs 28 while the rear ends of said springs are anchored to the truck frame thereby causing the load to be pulled instead of pushed. The rear ends of the rear springs 28 are more flexible that the front ends and consequently flatten out against the plates 23, thus automatically adjusting themselves to the required load.

The rear end of the rear frame section is of a deep box channel type and is provided with the bolts 4 which can be used to attach trailers.

The truck is so constructed that the whole power plant may be completely and quickly removed from the front frame unit to permit replacement and extensive repairs. The power plant and cab being mounted on the separate spring connected frame unit reduces shocks and vibrations on the working parts and adds comfort to the driver of the truck.

While the spring sockets 65 are shown secured to the front frame sills 52 above the front axle 68, it will of course be understood that said spring sockets may be secured to the front frame sills back of the front axle in a position where the front wheels when turned for steering will clear the rear frame springs 12, thereby enabling the front wheels to be turned at a sharper angle, thus permitting the truck to be turned in a smaller circle and also putting part of the torsion of the truck frame on the front frame springs 57.

If desired, the front wheel unit may have the springs 69 thereof connected to the front frame section in a manner similar to that in which the rear springs 28 are connected to the rear frame section.

We are aware that numerous details of construction may be varied through a wide range without departing from the principles of this invention, and we therefore do not purpose limiting the patent granted otherwise than necessitated by the prior art.

We claim as our invention:

1. A truck comprising a front power plant carrying unit, an extensible rear frame section, springs connecting the same to said front unit, a rear wheel unit, and means adapted to be secured in various positions along said extensible rear frame section for connecting the rear wheel unit to said extensible rear frame section.

2. A truck comprising a front truck frame, a rear truck frame, springs on said rear truck frame anchored to said front truck frame, springs on said front truck frame, and invertible shackles connecting said front truck frame springs to said rear truck frame.

3. A truck comprising a front frame section, an extensible rear frame section connected thereto adapted to be adjusted to vary the length of the truck, a front wheel unit supporting the front frame section, and a rear wheel unit adapted to be connected in different positions on said rear frame section to vary the length of the truck wheel base independently of variations in the length of the truck frame.

In testimony whereof, we have hereunto subscribed our names.

ALBERT EUGENE COOK.
THOMAS VAN TUYL.